US011860875B2

(12) United States Patent
Dupont et al.

(10) Patent No.: US 11,860,875 B2
(45) Date of Patent: *Jan. 2, 2024

(54) SYSTEM AND METHOD FOR ENCRYPTED SEARCH USING HASH VECTORIZATION MODELS

(71) Applicant: Cyborg Inc., New York, NY (US)

(72) Inventors: Nicolas Thomas Mathieu Dupont, New York, NY (US); Alexandre Helle, Forest Hills, NY (US)

(73) Assignee: Cyborg Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/889,847

(22) Filed: Aug. 17, 2022

(65) Prior Publication Data
US 2022/0391397 A1 Dec. 8, 2022

Related U.S. Application Data

(63) Continuation of application No. 17/408,851, filed on Aug. 23, 2021, now Pat. No. 11,423,028.
(Continued)

(51) Int. Cl.
*G06F 16/2455* (2019.01)
*G06F 16/248* (2019.01)
(Continued)

(52) U.S. Cl.
CPC .... *G06F 16/24561* (2019.01); *G06F 16/2255* (2019.01); *G06F 16/248* (2019.01); *G06F 16/285* (2019.01); *G06F 21/602* (2013.01)

(58) Field of Classification Search
CPC ............ G06F 16/24561; G06F 16/285; G06F 16/2255; G06F 16/248; G06F 21/602
See application file for complete search history.

(56) References Cited

U.S. PATENT DOCUMENTS 9,996,764 B2 6/2018 Cheng et al.
10,042,935 B1 8/2018 Perkins et al.
(Continued)

FOREIGN PATENT DOCUMENTS

KR    20170097908 A    8/2017
KR    102102307 B1    4/2020

OTHER PUBLICATIONS

Goh, E-J., "Secure Indexes," JACR Cryptology ePrint Archive, Mar. 2004, 18 pages.
(Continued)

*Primary Examiner* — Huawen A Peng
(74) *Attorney, Agent, or Firm* — COOLEY LLP (57) ABSTRACT

An encrypted search uses hash vectorization (HV) models, which are secure, one-way hash indices that are produced by a compression process, such as a modeling phase of Lempel-Ziv (LZ) parsing. Each HV model includes a hash filter and a chain vector. The hash filter is a Boolean quotient filter similar to Bloom filters, and allows for the quick elimination of negative query assessments. The hash filter is followed by a chain vector, which provides spatial modeling of hashed elements throughout the compressed and encrypted data, thereby providing increased levels of accuracy, efficiency, and query expressiveness as compared with known techniques.

20 Claims, 3 Drawing Sheets

US 11,860,875 B2
Page 2

Related U.S. Application Data (60) Provisional application No. 63/068,576, filed on Aug. 21, 2020.

(51) Int. Cl.
    *G06F 21/60*      (2013.01)
    *G06F 16/28*      (2019.01)
    *G06F 16/22*      (2019.01)

(56) References Cited

U.S. PATENT DOCUMENTS

| | | |
|---|---|---|
| 10,057,224 B2 | 8/2018 | Oxford et al. |
| 10,270,788 B2 | 4/2019 | Faigon et al. |
| 11,423,028 B2 | 8/2022 | Dupont et al. |
| 2007/0139227 A1 | 6/2007 | Speirs, II et al. |
| 2009/0043741 A1 | 2/2009 | Kim |
| 2015/0186471 A1* | 7/2015 | Yammahi ............ G06F 16/2468 707/780 |
| 2016/0210326 A1* | 7/2016 | Tolman ............... G06F 16/2423 |
| 2016/0292201 A1* | 10/2016 | Asaad ................. G06F 16/2365 |
| 2017/0220696 A1 | 8/2017 | Zhang et al. |
| 2018/0095720 A1* | 4/2018 | Gopal ................. G06F 16/2255 |
| 2019/0095490 A1 | 3/2019 | Colgrove et al. |
| 2019/0251189 A1 | 8/2019 | Vanderspek et al. |
| 2019/0325083 A1* | 10/2019 | Payer .................. G06F 9/30036 |
| 2021/0350026 A1* | 11/2021 | Doyle .................. G06F 16/152 |
| 2022/0058198 A1 | 2/2022 | Dupont |

OTHER PUBLICATIONS

International Search Report and Written Opinion for International Application No. PCT/US2021/047105, dated Dec. 1, 2021, 9 pages.

Kamara, S., "Encrypted Search," XRDS: Crossroads, The ACM Magazine for Students, vol. 21, No. 3, 2015, pp. 30-34., doi:10.1145/2730908.

Non Final Office Action dated Dec. 29, 2021 for U.S. Appl. No. 17/408,851, filed Aug. 23, 2021, 13 Pages.

\* cited by examiner

SYSTEM AND METHOD FOR ENCRYPTED SEARCH USING HASH VECTORIZATION MODELS

CROSS-REFERENCE TO RELATED APPLICATIONS

This application is a continuation of U.S. patent application Ser. No. 17/408,851, filed Aug. 23, 2021, and titled "System and Method for Encrypted Search Using Has Vectorization Models," which claims priority to and benefit of U.S. Provisional Patent Application No. 63/068,576, filed Aug. 21, 2020 and titled "System and Method for Encrypted Search Using Hash Vectorization Models," the disclosures of each of which are incorporated by reference herein in their entireties.

FIELD

The present disclosure relates to systems and methods for searching encrypted data, for example to identify encrypted files relevant to a search term or a search string.

BACKGROUND

Data encryption is an important field in cybersecurity, and is gaining tremendous importance in the $21^{st}$ century. Generally, encryption and cryptography entails scrambling or randomizing data in a reversible, deterministic way in order to render the data private in a secure manner. While encryption has evolved tremendously, rendering any hope of thwarting its security largely implausible with today's technology, it also poses challenges in the use of data, particularly for search and analytics. Encrypted search is a highly-researched field which hopes to address this issue.

SUMMARY

In some embodiments, an encrypted search uses hash vectorization (HV) models, which are secure, one-way hash indices that are produced by a compression process, such as a modeling phase of Lempel-Ziv (LZ) parsing. Each HV model includes a hash filter and a chain vector. The hash filter is a Boolean quotient filter similar to Bloom filters, and allows for the quick elimination of negative query assessments. The hash filter is followed by a chain vector, which provides spatial modeling of hashed elements throughout the compressed and encrypted data, thereby providing increased levels of accuracy, efficiency, and query expressiveness as compared with known techniques.

In some embodiments, a method for performing encrypted searches includes receiving, at a processor, a query specifying a search pattern. The search pattern is hashed, using the processor, to produce a plurality of search hashes. The plurality of search hashes is compared to a hash filter stored in a memory operably coupled to the processor, to determine a set of match candidates for the query. A data set is searched, based on the set of match candidates and using a chain vector, to identify a query result. The chain vector includes a plurality of chains, and each chain from the plurality of chains is associated with a hash value from a plurality of hash values of the data set. The method also includes at least one of causing display of the query result via a graphical user interface or causing transmission of a signal representing the query result to a remote compute device.

In some embodiments, a system for performing encrypted searches includes a processor and a memory that is operably coupled to the processor. The memory stores instructions that, when executed by the processor, cause the processor to receive a search pattern for a search of a data set, and to hash the search pattern, to produce a plurality of search hashes. The memory also stores instructions that, when executed by the processor, cause the processor to scan a hash filter, based on the plurality of search hashes, to determine a set of match candidates. The memory also stores instructions that, when executed by the processor, cause the processor to identify a result for the search, based on the set of match candidates and using a spatial model of the data set. The spatial model of the data set includes a linked set of byte string positions for each hash value from a plurality of hash values of the data set. The memory also stores instructions that, when executed by the processor, cause the processor to at least one of cause display of the result via a graphical user interface or cause transmission of a signal representing the result to a remote compute device.

In some embodiments, a non-transitory, processor-readable medium stores instructions to cause a processor to receive a query, and to generate a plurality of search hashes based on the query. The non-transitory, processor-readable medium also stores instructions to compare the plurality of search hashes to a hash filter stored in a memory operably coupled to the processor, to determine a set of match candidates for the query. The non-transitory, processor-readable medium also stores instructions to search a data set, based on the set of match candidates and using a chain vector, to identify a query result. The chain vector includes a plurality of chains, and each chain from the plurality of chains is associated with a hash value from a plurality of hash values of the data set. The non-transitory, processor-readable medium also stores instructions to cause display of the query result via a graphical user interface and/or cause transmission of a signal representing the query result to a remote compute device.

DETAILED DESCRIPTION

Data encryption is an integral part of twenty-first century digital infrastructure. For reasons ranging from security breaches to privacy regulations, the ability to secure/protect data from unauthorized access has never been more important. Despite their usefulness in data security, however, known encryption techniques suffer from a variety of implementation issues, such as data access management and the processing and searching of underlying data. In a hyper-digital economy, it is increasingly important to ensure both the protection of data and the ability to extract value from that data. These, however, are often competing interests when using known encryption techniques.

One or more of the encrypted search embodiments set forth herein overcome the shortcomings of known encryption techniques by facilitating end-to-end Advanced Encryption Standard (AES) encryption, full data security and state-of-the-art search performance, as discussed further below.

The History of Encrypted Search

The first searchable encryption scheme was proposed in 2000 by Song, Wagner and Perrig, who described the problem of searching over encrypted data using an example involving "Alice" and "Bob." Alice is an individual or entity that wants to store a set of documents on an untrusted server owned by Bob. Using the scheme of Song, et al., Alice is able to encrypt and store her documents in Bob's server, and Bob is then able to determine, with some probability, whether each document contains a specific keyword without learning anything else. Two approaches to encrypted search are proposed by Song et al.: one that involves scanning the document collection, and one that involves an index of keywords. Scanning, however, can take a prohibitively large amount of time for a large dataset, and updating an index can necessitate additional overhead and pose security risks.

Since the scheme of Song, et al. was proposed, many others have been constructed. Today's proposals are built on different cryptographic primitives, allowing for different levels of security, query complexity and efficiency. Searchable encryption schemes therefore have the goals of protecting user data, supporting different queries and performing optimally. Optimizing for any one goal typically comes at the expense of another. Therefore, the extent to which these goals are met differ in each scheme, and tradeoffs usually align with a specific set of a user's most immediate needs.

Secure Indexes/Indices

Secure indexes/indices are discussed in Eu-Jin Goh, "Secure Indexes." *IACR Cryptology EPrint Archive*, April 2004, the entire contents of which are incorporated by reference herein. Goh's secure indexes were proposed as a safer and more computationally efficient alternative to previous propositions of searching through encrypted data (such as the work by Song, et al.). Goh's construction not only improved security against statistical attacks and data leaks, but had other practical benefits, such as allowing for search over compressed data. Goh defines a secure index as a data structure through which a user can query a collection of documents in O(1) time without leaking information about the index or document itself. In Goh, an adversary cannot learn any new information about any word in a document's index, even if they have access to other index-document pairs. Searching is performed by providing a user with a trapdoor used to query the index. This trapdoor can only be generated using a private key.

Quotient Filters

Goh's secure indexes use Bloom filters and pseudo-random functions. A Bloom filter is a type of quotient filter, including a bit array that represents a set of $S=(s_1, \ldots, s_n)$ of n elements, with all bits in the array initially set to 0. When setting up the Bloom filter, r independent hash functions $h_1(s), \ldots, h_r(s)$, are computed on all elements in S. Each hash value returns a number between 1 and the size of the Bloom filter. The corresponding indices of this result are set to 1. In effect, the indices corresponding to the hash values of existing elements will be set to 1, and all other (non-existing) indices will remain 0.

When checking whether an element $\alpha$ is in S, $h_1(\alpha), \ldots, h_r(\alpha)$ is computed. If at least one resulting index in the Bloom filter is zero, $\alpha$ is not a member of S, otherwise, it may be. One downside of this approach is that it is exhibits a relatively high probability of returning a false positive. Minimizing false positives is possible through the reduction of hash collisions, which can be achieved by enlarging the hash filter and using more hash functions. However, this comes at the expense of added complexity in producing the Bloom filter, as well as increasing its size. In addition, in most real-world applications, false positives cannot practically be completely eliminated using quotient filters.

Pseudo-Random Functions

Although quotient filters like the Bloom filters used in Goh's secure indexes are limited in their effectiveness, they can be secured by the use of pseudo-random functions. Pseudo-random functions can be used to generate strings that are computationally indistinguishable from random strings, for example to ensure that no two occurrences of the same word are associated with the same combination of indices on two different filters. When quotient filters and pseudo-random functions are used together, they can provide an efficient way to search encrypted data, with improved data security as compared with methods that preceded it. Some structured encryption schemes described below leverage this construction, and offer further enhancements to search efficiency and search accuracy.

Structured Encryption

Structured Encryption (STE) is a category of encrypted search methods that refers to the private querying of data that is encrypted in an arbitrary data structure, such as a graph. Searchable Symmetric Encryption (SSE) is another category of encrypted search methods in which a private keyword search is performed over encrypted document collections. A STE scheme will typically accept structured data as an input, and output an encrypted data structure and a sequence of ciphertexts. Similar to Goh's secure indexes, when a query is performed using STE, a private key is used to generate a token, and the token is used to recover pointers to encrypted data. Index-based schemes like SSE, however, though secure, still reveal (or "leak") a certain amount of information. This information can be used by the server or any third-party listener to derive conclusions about the stored encrypted data. Data leaks therefore pose a security risk, especially if the leaked data includes sensitive data.

Homomorphic Encryption

Homomorphic Encryption is a method of encrypting data that allows a user to perform computations on the data without decrypting it. For example, an individual, A, with a private key can decrypt the data. A third-party, B, who does not have the private key and cannot decrypt the data, can perform operations (such as addition and multiplication) on the data, and retrieve encryptions of the results, without decrypting the data. B, therefore, does not learn anything about the contents of the data, and the data is never made vulnerable. Homomorphic encryption is useful, for example, when working with data that is safeguarded by law, such as medical records, since it facilitates analyses that do not risk privacy. Many homomorphic encryption schemes employ security mechanisms that are based on the Ring-Learning with Errors ("RLWE") computational problem in cryptographic key exchange. The RLWE problem, in combination with the homomorphic encryption scheme is generally considered to be secure against quantum computers.

There are three types of homomorphic encryption: partially homomorphic encryption ("PHE"), somewhat homomorphic encryption ("SHE"), and fully-homomorphic encryption ("FHE"). These types of homomorphic encryption differ primarily in the number of operations they support and the number of times these operations can be performed on the data. FHE is the most robust of the three types of homomorphic encryption, allowing for any function to be performed any number of times. Homomorphic encryption, however, has two limitations: it does not support multiple users, and for complex functions, computations become impractically slow. FHE schemes therefore have a significant computational overhead.

Encrypted Search Challenges

Some known encrypted search solutions (e.g., as discussed in S. Kamara, "Encrypted Search." *XRDS: Crossroads. The ACM Magazine for Students*, vol. 21, no. 3, 2015, pp. 30-34, doi:10.1145/2730908, the entire contents of which are incorporated by reference herein) are characterized by the tradeoffs they make between security, efficiency and query expressiveness:

1. Fully-homomorphic encryption (FHE) and oblivious RAM (GRAM) are secure and support expressive queries at the expense of efficiency.
2. Searchable encryption schemes built over property-preserving encryption (PPE) (e.g. order-revealing encryption, order-preserving encryption or deterministic encryption) are efficient and allow complex queries, but they are especially, vulnerable to statistical attacks.
3. Structured encryption schemes (STE), an example of which is searchable symmetric encryption (SSE), are secure and efficient, but do not support expressive queries.

Search Efficiency

FHE and ORAM are prominent security schemes, however these schemes have associated computational overheads that make them impractical for working with complex queries and extremely large data sets ("Big Data"), respectively. The first FHE scheme was proposed by Craig Gentry in 2009, and is based on ideal lattices and allows for any arbitrary function or expression that can be "efficiently expressed as a circuit" to be applied to the encrypted data. The permissible functions and expressions include integer circuit values (specifically, addition and multiplication) and Boolean circuit values (specifically, AND and XOR), from which complex queries and operations can be constructed. The result is that FHE can effectively produce results for "complex selection, range, join or aggregation [queries]." FHE schemes can thus support expressive queries, however some processes associated with FHE schemes, such as bootstrapping, make the scheme slow if the queries are sufficiently complex. Bootstrapping is used in known FHE schemes because homomorphic operations produce noise, which hinder a correct decryption. To reduce this noise, specific circuits can be evaluated that "refresh" a ciphertext and decrease its noise vector—a process that grows, in one respect, with the size of the circuit. This process is referred to as bootstrapping.

ORAM simulators, on the other hand, provide security by hiding an algorithm's access pattern. Software security through oblivious RAM was introduced by Rafail Ostrovsky in 1992. In that work, an oblivious machine was defined as a machine for which the sequence of accessed memory locations is the same for any two inputs with the same running time. Since, in GRAM, an oblivious RAM intercepts client-server communication, it can be used with different forms of encryption. For example, ORAM can be done via ME and SSE. The underlying cryptographic primitives and their corresponding data structures allow for different levels of overhead and query expressiveness. Overall, the use of ORAM is made slow by the computations performed at every fetch or store cycle to communicate between RAM and ORAM interfaces, which are responsible for hiding access patterns. The fastest scheme proposed by Ostrovsky had an O $(\log_3 t)$ amortized access cost, where t is the "current length of the access sequence" or the running time of the program simulated. Many schemes proposed since Ostrovsky's work, seeking to improve upon the overhead constraints, have nevertheless been practical only for small to medium collections.

Security & Leakage

Some schemes that are more efficient than ORAM and FHE sacrifice security for the sake of query expressiveness and efficiency. In 2011, for example, PPE was used to support search for a subset of structured query language (SQL) in a system called CryptDB. CryptDB made use of deterministic encryption (DTE) and order-preserving encryption (OPE) to allow for equality, comparison, sum and join queries. CryptDB's performance was reported to have a 14.5%-26% reduction in throughput when compared to MySQL. It has been shown, however, that CryptDB has serious security vulnerabilities. When researchers conducted a series of inference attacks on a database of electronic medical records, they were able to recover several OPE-encrypted attributes, such as age and disease severity, for more than 80% from 95% of the hospitals and several DTE-encrypted attributes, such as sex and race, for more than 60% of patients in more than 60% of the hospitals. DTE-encryption schemes, because they are constructed to produce the same ciphertext for the same keyword, are liable to attacks that look at the frequency of queries or frequency analysis attacks. One way to break into, or attack, DTE-encrypted columns of data, assuming the plaintext is strictly ordered (any $i \approx j$), is to sort both the plaintext, Z, and its corresponding ciphertext, C, and align the frequencies of each element. A similar sorting attack can be used on a dense OPE-encrypted column of data, sorting the ciphertext C and the message M and mapping each $c \in C$ to the equally ranked element in M.

Similarly, SSE researchers have experimented with different data structures to expand the set of possible queries on data, while maintaining efficiency. These schemes, however, have not made advances in security. In 2013, for example, an efficient SSE scheme, henceforth referred to as highly-scalable SSE (HS-SSE), was put forth. It builds on a well-established and well-known SSE scheme proposed in 2006 known as the "inverted index solution" O(II-SSE). HS-SSE trades security for efficiency, as previous constructions supporting conjunctive queries were too slow and inflexible for large databases. HS-SSE makes use of an "expanded inverted index" and other data structures, as well as search protocols that make use of Diffie-Hellman elliptic curves, to return pointers to relevant ciphertexts. The search complexity is independent of the size of the database, and a search for a conjunction of key words scales with the number of documents pertaining to the least frequent keyword in a conjunction. HS-SSE, as the name suggests, can scale with large databases and supports Boolean, negations, disjunctions, threshold queries and more on arbitrarily-structured data, as well as free text. The precisely-defined leakage profile, includes the total size of the database, access patterns and search patterns or repetitions of queries. Therefore, over time, SSE, although not traditionally known as the scheme accommodating the widest class of expressive queries, has been developed for more practical use. Significant trade-offs persist, however, in that FHE and CRAM prove to be most secure, whereas SSE and PPE-based schemes continue to be vulnerable to their respective extents.

Query Expressiveness

As discussed above, research has been conducted on known schemes that have shown progress in query expressiveness. To review, FHE supports expressive queries built from circuits, and CRAM, via FHE or SSE, can take on the expressiveness of underlying cryptographic primitives. Moreover, PPE can take advantage of properties preserved in encryption to test the ciphertexts for equality (DTE) or comparisons (OPE), which can be used to support large classes of SQL queries on relational databases. Recently, SSE schemes have been constructed to support Boolean, sums, disjunction and conjunction queries, where they formerly only supported single-keyword search. The FHE, ORAM and PPE schemes, however, have drawbacks that make them impractical or unsafe, despite providing ample query operations. STE schemes, such as SSE, on the other hand, are relatively secure and efficient, but different queries are achieved by different schemes. For example, in 2014, another SSE scheme was developed to support range queries, but it did not include the query classes in HS-SSE. The scheme, henceforth referred to as range-SSE (R-SSE), is built on dynamic SSE (1)-SSE). D-SSE which allows for updates and deletions of elements in a database and is proven to be forward and backward-secure—security notions to suppress and measure leakage from dynamic operations. R-SSE uses tree-like indexes and is one of the most efficient schemes of its kind, with search having an overhead of $O(w_q)$, where $w_q$ is the number of keywords within the range query, in client computation; $O(n_q)$, where $n_q$ is the number of updates that contain the keywords in a range query since initialization, in server computation; and $O(DB(q))$, where $DB(q)$ is the number of files matching a range query q, in server communication. Relative to II-SSE, which has an $O(1)$ overhead in both communication and server computation, R-SSE has had to make trade-offs to allow for more expressive queries than its SSE predecessors. Finding a scheme that fits any industry or user's needs is, unfortunately, still a question of which trade-offs one is willing to make. Query expressiveness, which can be an important factor in the usefulness of any searchable encryption scheme is still an area of active interest and research.

Disclosed Encrypted Search—A Novel, Secure and Efficient Solution

Hash Vectorization (HV) Model

According to some embodiments, the disclosed Encrypted Search (hereinafter "encrypted search") and its underlying compression algorithm, Stealth (hereinafter the "stealth algorithm"), use hash vectorization (HV) models to facilitate secure searching of encrypted data. An HV model is a secure, one-way hash index that is produced as a byproduct of a compression process, for example during the modeling phase of Lempel-Ziv (LZ) parsing. Additional details regarding LZ parsing are set forth below (see "LZ Modeling" section) and can also be found in U.S. provisional patent application No. 63/056,160, filed Jul. 24, 2020 and titled "Double-Pass Lempel-Ziv Data Compression with Automatic Selection of Static Encoding Trees and Prefix Dictionaries," the entire contents of which are incorporate by reference herein.

In some embodiments, an HV model includes a hash filter and a chain vector (collectively, a "hash index"). The hash filter is a Boolean quotient filter (e.g., similar to Bloom filters) that allows for the quick elimination of negative query assessments. The hash filter is followed by a chain vector, which provides spatial modeling of hashed elements throughout the compressed data and the encrypted data, facilitating higher levels of accuracy, efficiency, and query expressiveness.

In some embodiments, when a file is compressed using the stealth algorithm, the file is divided into chunks (also referred to herein as "data chunks") of a predefined or specified size (e.g., 64 KB each). The first part of LZ-family compression includes modeling the input data (the chunks) to find redundancies and map entropy for compression. This process can be referred to as LZ parsing, and in the context of the stealth algorithm, this process can be referred to as stealth double pass modeling (SDPM). SDPM, as the name suggests, includes two passes. The first pass includes mapping out the entire input buffer by hashing strings of a fixed size (e.g., 4 bytes each), using a hash table to find the last position of each hash (the previous potential redundancy, or the location of the last occurrence of the hash within the input buffer), and placing the last positions in a hash chain (which may be similar to, for example, a Markov chain). By the end of the first pass, a hash chain, having a length that is the same as a length of the input data, is filled/populated with positions of matches, with each position linked to the previous position having the same hash value. In other words, the most recent occurrence of each hash is stored at a given position in the input bytestream, such that every byte has a reference to the previous hash match. Hence, the hash chain has a length that is the same as the input data/input bytestream length. The hash chain is used in the second pass of SDPM to enable compression by finding ideal matches in the data, mapping those ideal matches, and encoding the mapped ideal matches and any remaining bytes during an entropy coding phase.

In known data compression environments, hash tables and Markov chains (or equivalents) are used solely for compression modeling, and are discarded after encoding. There is a considerable amount of information about the input data in hash tables and Markov chains, however, and that information can be repurposed for search purposes, as discussed in connection with embodiments of HV models set forth herein.

HV Models—Part 1: Hash Filter

As discussed above, in some embodiments, an HV model includes a hash filter and a chain vector. The hash filter is a "broad" O(or "coarse") filter that quickly eliminates most negative query candidates (i.e., subsets of data in a data set that are determined not to satisfy the query or not likely to satisfy the query). Query candidates are also referred to herein as "match candidates." By virtue of its need for fast performance, the hash filter is also elegantly designed.

Hash filters are a type of quotient filter with Boolean (e.g., true or false) data points about each hash value in the compressed/encrypted data. The first pass of SDPM uses a hash table of a given size (e.g., 65,536 hash values). At the end of SDPM's first pass, when a given position in the hash table contains a value, it can be concluded that the corresponding hash value has occurred somewhere in the input data. Due to the entropic nature of hashing, this means that any of the potential byte strings producing that given hash value could have occurred in the hash filter, an uncertainty that could potentially lead to false positives (i.e., hash collisions).

In some embodiments, one bit (0/1) is assigned to each hash value at the end of the first SDPM pass, to produce a hash filter. The size of this hash filter, in bits, will be equal to the size of the hash table (for example, a 65,536-hash value sized hash table will produce a hash filter of 65,536 bits, or 8,192 bytes). This size can be reduced significantly (as discussed below, in the "Optimizing HV Models" section).

When performing a search, hash filters can be used, as a first test to eliminate most negative candidates, by hashing the search pattern or keyword in the same manner as SDPM's first pass, and assessing the corresponding bits of the hash filter for each computed hash value. If any of the bits are 0, it can be concluded that the search pattern or keyword did not occur in the input data. Otherwise (i.e., if none of the bits are 0), the search pattern or keyword may have occurred in the input data. Confirmation can be performed during the second part of the HV model—the chain vector, discussed further below.

ITV Models Part 2: Chain Vector

According to some embodiments, a second part of the HV model is the chain vector. A chain vector includes a "distilled" copy of the hash chain that is used for search purposes, and that includes a collection of n chains, where η is the number of different hash values occurring in the input data. Instead of containing the exact position of each potential value, the positions are approximated by grouping the positions into buckets (e.g., bucket 0: positions 0-255; bucket 1: positions 256-511, etc.), resulting in a "distilled" copy of the hash chain, which reduces storage space. Chain vectors, like hash filters, can be produced as a byproduct of the SDPM process, and can offer significantly more granular search capability than hash filters, though at the expense of greater computational complexity. As a result, chain vectors may be reserved for query candidates that are not eliminated by hash filters, and as such, applied to a considerably smaller subset of candidates, as compared with an initial set of query candidates processed by the hash filters.

As discussed above, a first pass of SDPM can produce a hash chain, which is a linked list of positions sharing the hash values. In other words, the hash chain links a position of every byte string matching a hash value with a previous byte string having the same hash value. This process effectively creates a "road map" of the input data with respect to the hash value. The hash chain can be used for compression purposes, by "chaining" all possible matching values together and quickly identifying a best match.

The spatial linking of byte string positions by hash value is an important step in identifying optimal or near-optimal matches for data compression purposes, but also proves highly efficient for evaluating the presence of complex, multi-hash patterns for queries. This can be achieved by turning the SDPM hash chain into a chain vector that can then be used for encrypted search purposes.

In some embodiments, chain vectors describe the locations at which a given hash value occurs in the compressed/encrypted data (i.e., "position data" of the hash value). By hashing the sub-strings of a search pattern (e.g., using any hashing procedure set forth in the "LZ Modeling" section below), multiple hash values can be produced, and the chain vector can be used to determine whether all of these hash values occur in the same region of the data. If all of these hash values do occur in the same region of the data, it can be concluded that there is a statistically significant chance that the queried pattern occurs in the data. If all of these hash values do not occur in the same region of the data, it can be concluded with certainty that the pattern does not occur.

In some embodiments, to transform a hash chain into a chain vector, individual chains for each occurring hash value can be extracted from the hash chain. As noted above, these individual chains include n positions, where n represents a number of occurrences of the given hash value in the input data. To avoid saving all positions in the chain vector, which would involve more storage space than the input data itself, the input buffer can be grouped into "buckets" O(or "groups"), such that all positions in the hash chain occurring within the range of a given bucket will be identified by that bucket. The process of grouping the input buffer contents into buckets can significantly reduce the number of hash elements that are saved in the chain vector, while also reducing the range of possible positions, thereby significantly reducing the size of the chain vector. The process of grouping the input buffer contents into buckets also has security advantages, in that it can mitigate I prevent the reconstruction of the original data from which the HV Model has been produced. The process of grouping the input buffer contents into buckets can be performed more aggressively (with larger bucket sizes) or less aggressively (with smaller bucket sizes), which will yield different tradeoffs between chain vector size and granularity.

In some embodiments, the chain vector contains or enumerates the identifiers for each bucket that contains a given hash.

In some embodiments, bucket sizes are customizable, for example depending on a size of the input, a type of data being processed, a desired size of the HV Model and/or a desired size of the filter. A maximum number of buckets per chain, also referred to herein as "chain size," can be set such that every chain can be represented using the same number of bits independently of the number of buckets it represents. As a result, the number of occurrences of a hash value cannot be determined/inferred based on the chain size, and cryptoanalysis techniques such as frequency analysis are prevented, thereby improving the security of the chain vector.

In other embodiments, to protect the integrity of the chain vector, some or all chains may be individually/independently encrypted, for example with a 80-bit private key and using a 24-round Feistel encryption. Alternatively, the encryption can use another cipher method and key size. The encryption can be applied in the same manner, or in a common manner, across all chains.

A N-bit header can be appended to each encoded chain, specifying the encoding method used (e.g., specifying the bucket size used to encode that chain), where N=log2 (Number of different bucket sizes).

Searching with HV Models

HV models of the present disclosure are constructed with security, query expressiveness, and efficiency in mind. To that end, in some embodiments, performing an HV model search includes three steps: hashing the search pattern, scanning the hash filter, and grouping the chain vector into buckets. Additional steps can be included in the HV model search, for example to expand query expressiveness (e.g., AND, OR, ranges, etc.). The foregoing three steps, however, give a broad overview of the main search procedure.

As noted above, in some embodiments, the first step of an HV model search is hashing the search pattern. Unlike known hash-based search methods (e.g., quotient filters), according to some methods set forth herein, an entire search pattern (or "element") is not hashed at once. Rather, the search pattern is divided into substrings that are independently hashed. This improves security by randomizing the hash filter while facilitating powerful querying techniques such as partial matching.

In some embodiments, hashing the search pattern includes using a sliding window of a predefined fixed size such as 4 bytes, in which the search pattern is advanced or "slid" across, one byte at a time, and performing a hash of each subsequent substring. The number of hashes produced from a single search pattern can be equal to the difference of the pattern size and the hash plus one. For example, a search pattern of 5 bytes with a hash size of 4 bytes will produce 2 hashes ($h_1[0-3]$, $h_2[1-4]$).

Once the hashing step is completed, hash filter scanning can commence. As discussed above, hash filters include Boolean (true/false) values for each hash value occurring within the compressed encrypted data. The use of hash filters can involve minimal computation during searching, resulting in faster, more efficient performance. For each computed hash value searched, a corresponding/associated hash filter bit is checked (e.g., hash value 6,512 will correspond to the $6,512^{th}$ bit). Should all corresponding bits be true (1), it can be concluded that there is a significantly high likelihood that the compressed/encrypted data contains the search pattern, and that compressed/encrypted data is flagged for chain vector grouping. Alternatively, should any of the bits be false (0), it can be concluded that there is a 0% chance that the pattern has occurred, effectively eliminating the compressed/encrypted data as a candidate for containing the search pattern.

In some embodiments, in a next (optionally final) step, chain vector grouping, is performed, and is reserved for the subset of compressed/encrypted candidate chunks (or data chunks) that were not eliminated by hash filter scanning. As discussed herein, chain vectors are more granular than hash filters, facilitating higher levels of search accuracy and query expressiveness, while costing some computational overhead on the order of $O(\log(n))$. During a search, the chain vector can be used to isolate areas of the compressed/encrypted data that contain the search hashes, and to group them and determine whether their approximate positions (also referred to herein as "position data") would permit the original search term to occur or not.

In some embodiments, chain vectors include two parts: a header including chain sizes, and vectorized chains. The hash filter can be used to determine which hash values occur in the chain vector. For each hash value that occurs in the chain vector, a corresponding or associated vector size can be stored in the header. Once the vector sizes for each search hash are determined using this header, the respective vectors for each hash can be read. Each vectorized chain represents the regions, or "buckets," of the compressed/encrypted data in which the respective hash occurs. By comparing the vectors of each search hash, it can quickly, be determined whether they align properly (e.g., are adjacent or in close enough proximity) to form a match of the original search pattern. For example, should the two searched hashes occur in buckets 1 and 5, then they are not in the same region of data, and therefore cannot have occurred together to have formed the original search pattern. However, if they had both occurred in the same or adjoining buckets, then there is a very significant chance (e.g., >99%) that the compressed/encrypted data contains a match for the query. The relevant data region(s) can then be flagged for partial decryption & decompression, and used accordingly.

Optimizing HV Models

Three primary considerations for optimizing HV Models are accuracy, size, and performance. The accuracy and size of HV models follow a well-established direct correlation. For example, a larger HV model will produce more accurate results than a smaller HV model.

Encrypted Search—Encryption

In some embodiments, encrypted search includes a search capability as well as encryption. Encrypted search methods set forth herein, unlike known techniques, can use AES encryption and supports every cipher mode specified in the AES standard. As such, in some embodiments, encrypted search methods do not include any modifications to the encryption itself. The compatibility of encrypted search with existing AES encryption and its ability to support existing cipher modes are significant advantages over known techniques, since proposing new methods of encryption can involve extensive standardization, testing, and universal acceptance. These standardization and testing processes can take decades, as can be seen with AES's ongoing deployment (note that the standard was published in 2001). Any solution proposing new or modified encryption ciphers is therefore impractical for real-world applications.

Some embodiments of encrypted search can leverage existing encryption, such as AES, since a full search capability for encrypted data is implemented via the compression and production of HV models, both of which occur prior to encryption. This enables the HV model to be independently decrypted (e.g., by a cloud computing service), securely searched, and in turn provide actionable results without decrypting the original data or leaking otherwise-unintended information.

Salting & Token Randomization

Some known hash-based algorithms can be vulnerable to statistical and preimage attacks. These types of attacks exploit the deterministic nature of hashing, and map out every possible input for a given hash value, and use the entropy of these hash collisions to gain useful information about the encrypted data. To secure encrypted searches against such attacks, in some embodiments, a salting process can be used.

Salting is typically used for safe credential storage, where a credential such as a password is hashed and saved in a database. To protect against the types of attacks described above, passwords can be concatenated with a cryptographically random value (a "salt"), which is also saved in the database. As a result, two identical passwords, with different random salts, will produce two different hash values. This effectively randomizes the hashing function, and deters most statistical attacks.

In some embodiments, an HV model employs a salting process, to a similar effect. For example, during a stealth compression process, a cryptographic nonce (a random value) is generated, and is used as a salt. Throughout the SDPM process, the salt is added to the input byte strings, consistently randomizing the hashing process. This has no impact on compression performance, but effectively randomizes the HV model. With this process, the output of the hashing process produced from identical data will be completely different, given the use of different salts.

For applications involving network transmission of queries, such as queries of cloud-based databases, the hashing and salting of search patterns can be performed on a (trusted) client, and the randomized, salted hash values can be transmitted to an (untrusted) server where a search may be executed. Such an approach effectively renders the server-based query process to be fully opaque, with neither the query nor the HV models providing useful information or security leakage. Further protection can be applied via the use of transport-layer encryption.

Query Approximation

In some embodiments, given the hash-based nature of HV models, false positive results may occur, however, false negative results can never occur. The level of accuracy (and therefore the size) of an HV model has a direct, inverse relationship with false positive rates. In other words, a larger (and therefore more accurate) HV model can produce fewer false positives than a smaller HV model. The difference can range from 10% to <0.1% false positives using the full HV model (i.e., the hash filter and the chain vector), and can have a much larger range (approx. 50%-15%) when only employing a hash filter (with no chain vector).

The range of false positives described above leads to query approximation—a degree of uncertainty with the veracity of provided results (some of which may also prove to be false positives). In a non-encrypted environment, this query approximation can be easily removed by confirming the search through a simple pattern matching algorithm (e.g., Boyer-Moore) on the original data. Encrypted search, however, prohibits the decryption of the data for searching purposes. As such, a degree of query approximation may be expected.

Query approximation, while potentially obscuring granular query results, also provides a layer of additional security against security compromise. Since there is an inherent degree of uncertainty for each hash element in the HV model, any attempt to analyze the HV model (assuming it is in a decrypted form) will prove exponentially more difficult with uncertainty, with a complexity close to $C)((w)n^n)$, where w denotes the uncertainty plus one (between 1.0 and 2.0, inclusive) and n denotes the number of hash values to ascertain. This effectively adds a layer of security, should the encryption protection a HV model ever be compromised.

Chunking & Partial Decryption

In some embodiments, the compression algorithm underlying encrypted search—the stealth algorithm—divides input plaintext into chunks of data (e.g., 64 KB each), i.e., data chunks. This chunking, while sometimes performed for decompression efficiency purposes, also facilitates independent encryption and partial decryption of the searched data.

Since the original data is segmented into independent chunks, each chunk can be compressed and encrypted independently, thereby facilitating independent decryption and independent decompression, should a given chunk be flagged during a search. For example, if a HV model search isolates a given chunk for a positive query match, this chunk can be independently accessed without decrypting the entirety of the data of the encrypted file, which would render the entire encrypted file vulnerable. The chain vectors, by virtue of their accuracy, can even isolate the location of a match within a given chunk, providing a greater degree of granularity for targeted decryption/decompression.

Security Leakage

Encrypted search embodiments set forth herein enhance/optimize data security without compromising search efficiency and query expressiveness. In addition to preventing security leakage, encrypted search can reside or be built on existing standards, making it suitable for use in commercial applications. The encrypted search methods described herein can be used for a variety of applications, including cloud computing, electronic health records management, finance, analytics, and social media.

LZ Modeling

In some embodiments, an encoder is part of a "Lempel-Ziv" O("LZ")-modeled encoder family. LZ modeling makes it possible for the encoder; compressor to identify byte sequences that are similar to one another within an input bit stream. The identified similar byte sequences can, in turn, be used to compress the data of the input bit stream. For example, the first time that a given byte sequence appears within the input bit stream, the LZ modeling function may identify that byte sequence as a "literal byte" sequence. Subsequently, whenever the same byte sequence occurs, the LZ modeling function can identify that byte sequence as a "match." The foregoing process is referred to herein as "parsing" the data. As discussed above, when the parsing quality is higher, the compression ratio is typically also higher, however increasing the parsing quality can also result in a slower process. In view of this trade-off, multiple different embodiments of encoders (and associated methods) are presented herein, ranging from encoders having a fastest compression, to encoders having a slowest compression but a highest compression ratio. The encoder embodiments set forth herein leverage modern processor architectures, while innovating the manner in which data is parsed, for example using different numbers of passes based on the parsing quality selected.

In some embodiments, LZ modeling is performed on the encoder but not on the associated decoder, and the quality of the parsing used on the encoder does not affect the decoder speed.

Single-Pass Modeling

In some embodiments, a processor-implemented encoder employs one-pass modeling, or single-pass modeling (SPM), operated by the function fast_search_match_multi_XH( ), and exhibits the fastest parsing of the encoders described herein. SPM includes creating a hash table to check and store the positions of each byte sequence in an input hit stream. Each instance of a byte sequence having a same hash value as a previously observed instance of the byte sequence is used to overwrite that previously observed instance. A size of the byte sequences can be, for example, four bytes or six bytes, and may be determined by a size of the input bit stream. In some implementations, a size of the hash table is relatively large (e.g., 64 kilobytes (KB)), e.g., to reduce the likelihood of collisions.

The following code illustrates a process to hash a single byte sequence, according to some embodiments:

```
// Hash a sequence of 4 bytes
uint16_t hash_value = hash4B(new_position) ;
// Get the previous position
previous_position = hash_table[hash_value] ;
// Update the position in the hash table
hash_table[hash_value] = new_position;
```

In some embodiments, to leverage modern x86 architectures, SPM hashes four candidate byte sequences at a time (i.e., concurrently) before checking for a match against the hash table. This allows the processor to perform the comparisons Out-of-Order (OoO) and feed the pipeline. The following code illustrates a process to hash four consecutive candidate byte sequences, according to some embodiments:

```
// Hash 4 consecutive sequences of 4 bytes and store the position of the
// candidate
candidate[0] = pre_hash_4B(&length[0], hash_table, ip, begin, 0) ;
candidate[1] = pre_hash_4B(&length[1], hash_table, ip, begin, 1) ;
candidate[2] = pre_hash_4B(&length[2], hash_table, ip, begin, 2) ;
candidate[3] = pre_hash_4B(&length[3], hash_table, ip, begin, 3) ;
```

The hashes of the four candidate byte sequences are then sequentially compared to the hash table to attempt to identify a match. If a match is found, a function match_length_unlimited( ) is called and used to attempt to expand the size of the matching byte sequence in a forward direction within the input bit stream (e.g., incrementally expanding the byte sequence to include bits or bytes occurring subsequent to the byte sequence within the input bit stream). To obtain the size of a match, a De Bruijn sequence can be used, which allows a fast comparison of two byte sequences and returns the size of their common substring. Depending on the desired quality level, a match also can be expanded in a backward/reverse direction within the input bit stream (e.g., incrementally expanding the byte sequence to include bits or bytes preceding the byte sequence within the input bit stream) by the function LZsearch_backward( ). To store the match, a function save_triad_unlimited® is called. In some implementations, only the first match identified is stored, and the three other matches may be used as potential matches for future byte sequences, thereby improving the overall compression ratio of the encoder. If no matches are found among the four candidate byte sequences, the byte sequences may be stored (e.g., in a separate buffer) as byte literals.

A match can be represented by a structure that includes the following three variables, collectively referred to herein as a "triad":

Length: the size of the byte substring returned by the De Bruijn technique+optional backward expansion Offset: the distance between the matching byte sequence and the current byte sequence Number of literals: the number of byte literals between the match found and the previous match, within the bit stream Example code illustrating the storage of the triad is as follows:

```
/* stealth_triad_t: LZ triad storage */
typedef struct {
// Distance from the match
uint32_t offset;
// Match length storage
uint8_t length;
Number of literal before the macth
uint8_t nb_literal;
} stealth_triad;
```

In some embodiments, the foregoing process is repeated until an end of the input bit stream is reached, at which time the SPM returns the literal buffer and the triad buffer to be encoded (see "Byte Literal Encoding" and "Triad Encoding" sections, below).

The offset portion of the triad is stored as a 32-bit integer, pre-encoded as shown below (e.g., for faster retrieval), while the length and number of literals are respectively stored as 8-bit integers.

```
// Save it
*storage = (uint32_t)(offset | (uint32_t)reduced << 20 | (uint32_t)acc << 28);
```

| Accuracy identification | Reduced offset | Actual offset |
|---|---|---|
| 4 bits | 8 bits (up to 256) | 20 bits (up to 2 ^20 − 1) |

Figure 1:
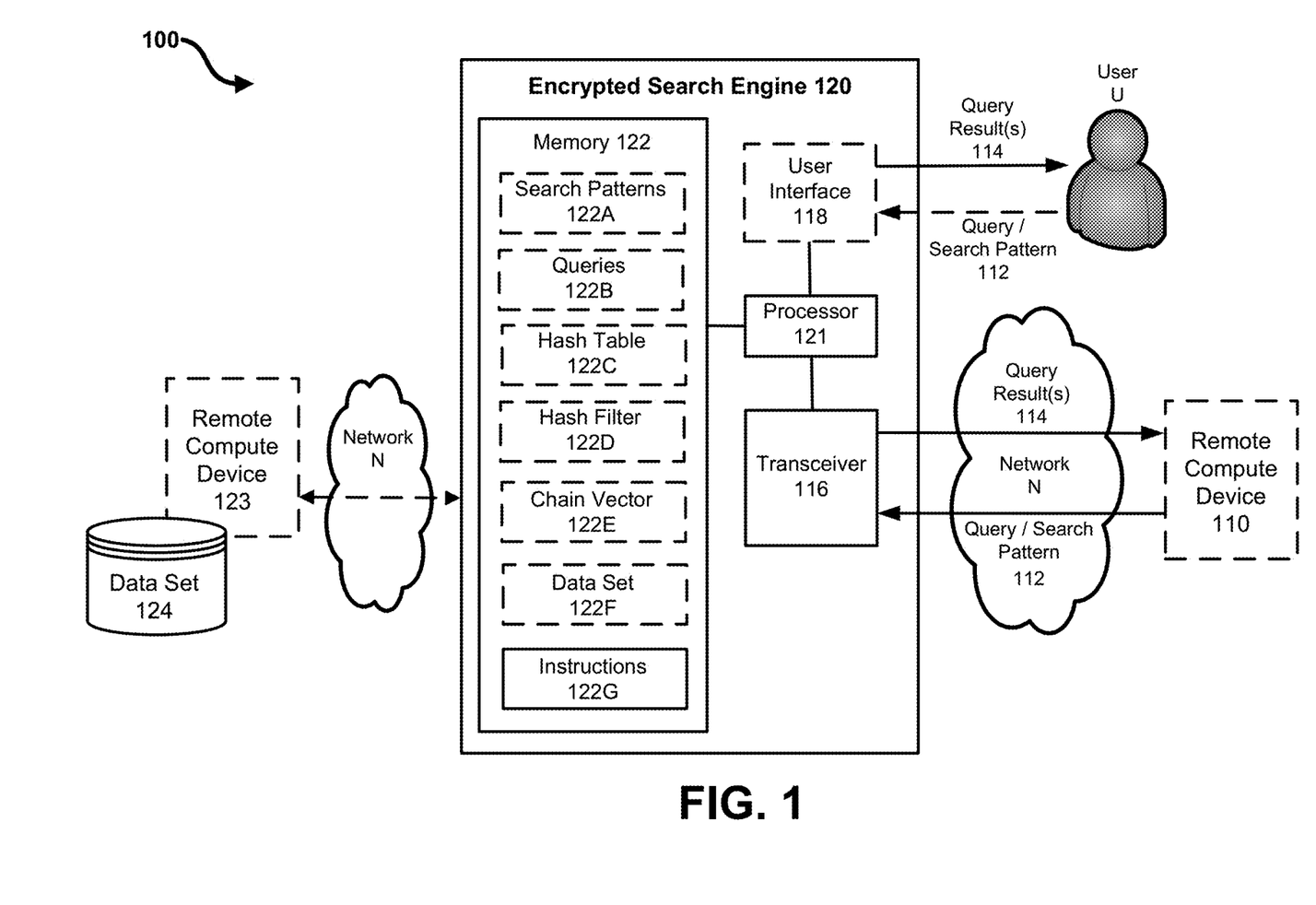
FIG. 1 is a system block diagram for an encrypted search engine, according to some embodiments.

FIG. 1 is a system block diagram for an encrypted search engine, according to some embodiments. As shown in FIG. 1, the system 100 includes an encrypted search engine 120, which includes a processor 121 in communication with a memory 122 and a transceiver 116 for optional wireless and/or wireless communication (e.g., via a wireless network N) with a remote compute device 110 and/or data set 124. The encrypted search engine 120 optionally includes a user interface 118 (e.g., a graphical user interface (GUI)) through which a user U can input a search term or other search criteria (as data input 112), and through which a user can view search results 114 that are generated by the encrypted search engine 120 in response to the search term provided by the user. The memory 122 can store search patterns 122A and/or queries 122B, which may be received (at 112) directly from a user via the user interface 118 and/or via network N and from the remote compute device 110. The memory 122 can also store one or more hash tables 122C associated with one or more data files (e.g., encrypted and/or compressed data files) of a data set (122F and or 124) of the system 100, a hash filter 122B, a chain vector 122E and/or the data set 122F. The memory 122 also stores instructions 122G, executable by the processor 121 to perform steps, such as those set forth in the discussion of FIGS. 2-3 below. The encrypted search engine 120 can receive a query or search pattern 112 (where a search pattern can include, for example, a keyword) from the user U or from the remote user compute device 110 and/or can cause display of query result(s) 114 via the user interface 118 and/or can send query result(s) 114 to the remote user compute device 110, for example wirelessly via network N. The query result(s) 114 can be generated by the encrypted search engine 120, e.g., according to instructions 122G, in response to the query or search pattern 112. In some embodiments, the query result(s) can be further refined using a machine learning model (not shown) and/or can be sent to a machine learning platform (not shown) as training data for training of a machine learning model of the machine learning platform.

Figure 2:
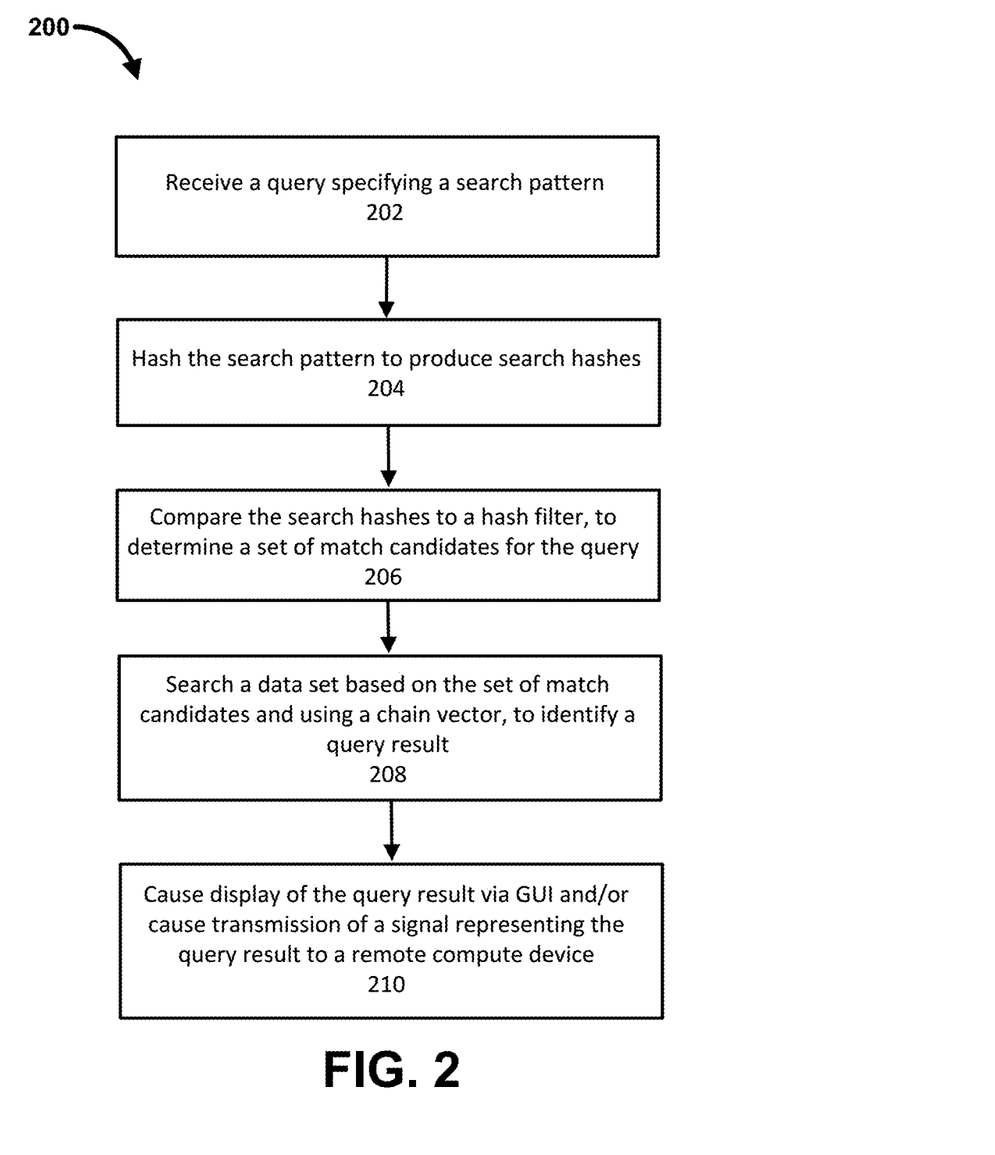
FIG. 2 is a flow diagram showing a first method for performing encrypted searches, according to some embodiments.

FIG. 2 is a flow diagram showing a first method for performing encrypted searches, according to some embodiments. The method 200 of FIG. 2 can be implemented, for example, using the system 100 of FIG. 1. As shown in FIG. 2, the method 200 includes receiving, at 202 and at a processor, a query specifying a search pattern. The search pattern is hashed at 204, using the processor, to produce a plurality of search hashes. The hashing performed at 204 can include, for example, a hashing procedure set forth in the "LZ Modeling" section above. The plurality of search hashes is compared, at 206, to a hash filter stored in a memory operably coupled to the processor, to determine a set of match candidates for the query. At 208, a data set is searched, based on the set of match candidates and using a chain vector, to identify a query result. The chain vector includes a plurality of chains, and each chain from the plurality of chains is associated with a hash value from a plurality of hash values of the data set. The method 200 also includes at least one of causing display of the result via a graphical user interface or causing transmission of a signal representing the result to a remote compute device, at 210.

In some implementations, the searching the data set includes identifying portions of the data set that include search hashes from the plurality of search hashes, and determining, based on position data associated with the identified portions of the data set, whether the search pattern is expected to occur within the identified portions of the data set.

In some implementations, the method also includes mapping the data set by hashing each string from a plurality of strings of the data set, with each string having a predefined number of bytes, thereby generating a plurality of hashed strings. A last position is identified for each hashed string from the plurality of hashed strings, thereby generating a plurality of last positions, a hash chain is generated based on the plurality of last positions, and the chain vector is generated based on the hash chain. The generating the chain vector based on the hash chain can include extracting the plurality of chains from the hash chain, and grouping chains from the plurality of chains based on position data of the plurality of chains.

In some implementations, the hashing the search pattern includes dividing the search pattern into a plurality of substrings, and independently hashing each substring from the plurality of substrings. In other implementations, the hashing the search pattern is performed using a sliding window having a predefined size (e.g., four bytes).

In some implementations, the hash filter includes a plurality of Boolean values, each Boolean value from the plurality of Boolean values associated with a hash value from a plurality of hash values of the data set, the data set being at least one of compressed or encrypted.

In some implementations, each match candidate from the set of match candidates includes a data chunk of the data set, the data set including at least one of compressed data or encrypted data.

In some implementations, the comparing the plurality of search hashes to the hash filter includes comparing each search hash from the plurality search hashes to an associated bit of the hash filter.

Figure 3:
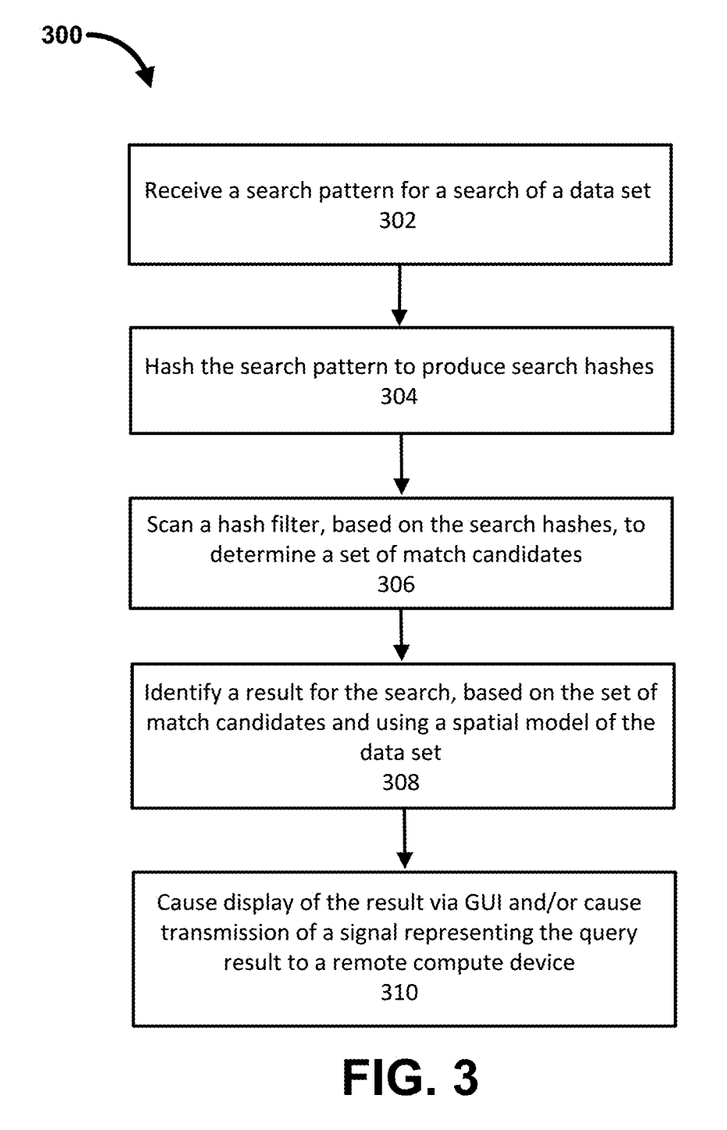
FIG. 3 is a flow diagram showing a second method for performing encrypted searches, according to some embodiments.

In some embodiments, a system for performing encrypted searches can include a processor and a memory that is operably coupled to the processor (e.g., as shown in FIG. 1). The memory stores instructions that, when executed by the processor, cause the processor to perform, a method, such as the method of FIG. 3. FIG. 3 is a flow diagram showing a second method for performing encrypted searches, according to some embodiments. The method 300 of FIG. 3 can be implemented, for example, using the system 100 of FIG. 1. As shown in FIG. 3, the method 300 includes receiving a search pattern at 302 for a search of a data set, and hashing the search pattern at 304, to produce a plurality of search hashes. The hashing performed at 304 can include, for example, a hashing procedure set forth in the "LZ Modeling" section above. The method 300 also includes scanning a hash filter at 306, based on the plurality of search hashes, to determine a set of match candidates. At 308, a result for the search is identified based on the set of match candidates and using a spatial model of the data set. The spatial model of the data set includes a linked set of byte string positions for each hash value from a plurality of hash values of the data set. At 310, the query results is at least one of: caused to be displayed via a graphical user interface, or caused to be transmitted, via a signal, to a remote compute device.

In some implementations, the instructions to cause the processor to hash the search pattern include instructions to divide the search pattern into a plurality of substrings, and independently hash each substring from the plurality of substrings.

In some implementations, the instructions to cause the processor to hash the search pattern include instructions to hash the search pattern using a sliding window having a predefined size.

In some implementations, the hash filter includes a plurality of Boolean values, each Boolean value from the plurality of Boolean values associated with a hash value from a plurality of hash values of the data set, the data set being at least one of compressed or encrypted.

In some implementations, each match candidate from the set of match candidates includes a data chunk of the data set, the data set including at least one of compressed data or encrypted data.

In some embodiments, a non-transitory, processor-readable medium stores instructions to cause a processor to receive a query, and to generate a plurality of search hashes based on the query. The non-transitory, processor-readable medium also stores instructions to compare the plurality of search hashes to a hash filter stored in a memory operably coupled to the processor, to determine a set of match candidates for the query. The non-transitory, processor-readable medium also stores instructions to search a data set, based on the set of match candidates and using a chain vector, to identify a query result. The chain vector includes a plurality of chains, and each chain from the plurality of chains is associated with a hash value from a plurality of hash values of the data set. The non-transitory, processor-readable medium also stores instructions to cause display of the query result via a graphical user interface and/or cause transmission of a signal representing the query result to a remote compute device.

In some implementations, the hash filter includes a plurality of Boolean values, each Boolean value from the plurality of Boolean values associated with a hash value from a plurality of hash values of the data set, the data set being at least one of compressed or encrypted.

In some implementations, each match candidate from the set of match candidates includes a data chunk of the data set, the data set including at least one of compressed data or encrypted data.

In some implementations, the instructions to cause the processor to compare the plurality of search hashes to the hash filter include instructions to compare each search hash from the plurality search hashes to an associated bit of the hash filter.

In some implementations, the instructions to generate the plurality of search hashes include instructions to divide a search pattern of the query into a plurality of substrings, and independently hash each substring from the plurality of substrings.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B), in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the embodiments, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" O(or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of" and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
comparing, via a processor, a plurality of search hashes to a hash filter stored in a memory operably coupled to the processor, to determine a set of match candidates for a query;
searching a data set, via the processor, based on the set of match candidates and using a chain vector, to identify a query result, the chain vector including a plurality of chains, each chain from the plurality of chains being associated with a hash value from a plurality of hash values of the data set; and
at least one of causing display of the query result via a graphical user interface or causing transmission of a signal representing the query result to a remote compute device.

2. The method of claim 1, wherein the searching the data set includes:
identifying portions of the data set that include search hashes from the plurality of search hashes; and
determining, based on position data associated with the identified portions of the data set, whether a search pattern associated with the query is expected to occur within the identified portions of the data set.

3. The method of claim 1, further comprising:
mapping the data set by hashing each string from a plurality of strings of the data set, each string from the plurality of strings having a predefined number of bytes, thereby generating a plurality of hashed strings;
identifying a last position for each hashed string from the plurality of hashed strings, thereby generating a plurality of last positions;
generating a hash chain based on the plurality of last positions; and
generating the chain vector based on the hash chain.

4. The method of claim 3, wherein the generating the chain vector based on the hash chain includes:
extracting the plurality of chains from the hash chain; and
grouping chains from the plurality of chains based on position data of the plurality of chains.

5. The method of claim 1, further comprising generating the plurality of search hashes by:
dividing a search pattern associated with the query into a plurality of substrings; and
independently hashing each sub string from the plurality of substrings.

6. The method of claim 1, further comprising generating the plurality of search hashes using a sliding window having a predefined size.

7. The method of claim 6, wherein the predefined size is four bytes.

8. The method of claim 1, wherein the hash filter includes a plurality of Boolean values, each Boolean value from the plurality of Boolean values associated with a hash value from the plurality of hash values of the data set, the data set being at least one of compressed or encrypted.

9. The method of claim 1, wherein each match candidate from the set of match candidates includes a data chunk of the data set, the data set including at least one of compressed data or encrypted data.

10. The method of claim 1, wherein the comparing the plurality of search hashes to the hash filter includes comparing each search hash from the plurality search hashes to an associated bit of the hash filter.

11. A system, comprising:
a processor; and
a memory, operably coupled to the processor and storing instructions that, when executed by the processor, cause the processor to:
scan a hash filter, based on a plurality of search hashes associated with a query, to determine a set of match candidates;
identify a result for the search, based on the set of match candidates and using a spatial model of a data set associated with the query, the spatial model of the data set including a linked set of byte string positions for each hash value from a plurality of hash values of the data set; and
at least one of cause display of the result via a graphical user interface or cause transmission of a signal representing the result to a remote compute device.

12. The system of claim 11, wherein the memory further stores instructions to generate the plurality of search hashes by:
dividing a search pattern into a plurality of sub strings; and
independently hashing each sub string from the plurality of sub strings to produce the plurality of search hashes.

13. The system of claim 11, wherein the memory further stores instructions to generate the plurality of search hashes by hashing a search pattern using a sliding window having a predefined size.

14. The system of claim 11, wherein the hash filter includes a plurality of Boolean values, each Boolean value from the plurality of Boolean values associated with a hash value from the plurality of hash values of the data set, the data set being at least one of compressed or encrypted.

15. The system of claim 11, wherein each match candidate from the set of match candidates includes a data chunk of the data set, the data set including at least one of compressed data or encrypted data.

16. A non-transitory, processor-readable medium storing instructions to cause a processor to:
scan a hash filter, based on a plurality of search hashes associated with a query, to determine a set of match candidates;
identify a result for the search, based on the set of match candidates and using a spatial model of a data set associated with the query, the spatial model of the data set including a linked set of byte string positions for each hash value from a plurality of hash values of the data set; and
at least one of cause display of the result via a graphical user interface or cause transmission of a signal representing the result to a remote compute device.

17. The non-transitory, processor-readable medium of claim 16, further storing instructions to generate the plurality of search hashes by:
dividing a search pattern into a plurality of sub strings; and
independently hashing each sub string from the plurality of sub strings to produce the plurality of search hashes.

18. The non-transitory, processor-readable medium of claim 16, further storing instructions to generate the plurality of search hashes by hashing a search pattern using a sliding window having a predefined size.

19. The non-transitory, processor-readable medium of claim 16, wherein the hash filter includes a plurality of Boolean values, each Boolean value from the plurality of Boolean values associated with a hash value from the plurality of hash values of the data set, the data set being at least one of compressed or encrypted.

20. The non-transitory, processor-readable medium of claim 16, wherein each match candidate from the set of match candidates includes a data chunk of the data set, the data set including at least one of compressed data or encrypted data.

* * * * *